United States Patent [19]

Pilipovich et al.

[11] 4,102,950
[45] Jul. 25, 1978

[54] METHOD FOR PRODUCING SINGLET MOLECULAR OXYGEN

[75] Inventors: Donald Pilipovich, Agoura; Ira B. Goldberg, Thousand Oaks; Ross I. Wagner, Woodland Hills, all of Calif.

[73] Assignee: Rockwell International Corporation, El Segundo, Calif.

[21] Appl. No.: 823,910

[22] Filed: Aug. 12, 1977

[51] Int. Cl.$^2$ .............................................. C01B 13/02
[52] U.S. Cl. ..................................... 423/579; 252/372
[58] Field of Search ............... 423/579, 462, 466, 467, 423/415 R, 581; 252/372

[56] References Cited

U.S. PATENT DOCUMENTS

| 3,780,165 | 12/1973 | Schack et al. | 423/467 |
| 3,980,762 | 9/1976 | Shiblom et al. | 423/579 |

OTHER PUBLICATIONS

Braver "Handbook of Preparative Inorganic Chemistry", vol. 1, 1963, pp. 158 & 159.
Cotton et al., "Advanced Inorganic Chemistry", Third Ed., 1972, pp. 411 & 412.
Kearns, "Chemical Reviews," 1971, vol. 71, No. 4, pp. 395–411.
Foote et al., "J. Am. Chem. Soc., 90, 1968, pp. 975–981.

Primary Examiner—Edward J. Meros
Attorney, Agent, or Firm—L. Lee Humphries; Craig O. Malin

[57] ABSTRACT

A method and generator are provided for producing singlet molecular oxygen, $O_2$ ($^1\Delta_g$). A hypohalite selected from the group consisting of $BrSO_3F$, $BrNO_3$, $BrOCF_3$, $ClSO_3F$, $ClNO_3$, $ClOCF_3$, $FSO_3F$, $FOCF_3$, and $ISO_3F$, is reacted with hydrogen peroxide to produce singlet molecular oxygen. A preferred embodiment of the reaction is illustrated by the following example:

$$ClSO_3F + H_2O_2 \rightarrow O_2(^1\Delta_g) + HSO_3F + HCl.$$

The generator for producing the singlet molecular oxygen is a reactor vessel having nozzles for introducing the chlorine fluorosulfate and hydrogen peroxide into the vessel. An outlet is provided for withdrawing the products, and the singlet molecular oxygen is separated by condensing out the other products in a condenser.

19 Claims, 1 Drawing Figure

METHOD FOR PRODUCING SINGLET MOLECULAR OXYGEN

BACKGROUND OF THE INVENTION

A. Field of the Invention

This invention relates to the field of chemistry and particularly to the field of producing molecules in excited states, such as singlet molecular oxygen, $O_2(^1\Delta_g)$.

B. Description of the Prior Art

Molecules such as $O_2$ can exist in different energy states depending upon the arrangement of the electrons about the nucleus. The molecule is in an excited state when it is in an energy state above its usual ground state. One of the excited states for the oxygen molecule is the singlet molecular oxygen state generally identified by the symbol $O_2(^1\Delta_g)$ or by the abbreviation $O_2^*$. This molecule has practical utility because it has 1.0 ev of energy above the normal ground state, and thus can serve as a source of pumping energy in a chemical laser or as a synthesizing reagent for making organic compounds.

The generally used method of producing singlet molecular oxygen is via a microwave discharge in oxygen. Unfortunately, this technique produces low concentrations of singlet molecular oxygen (in the range of 1 to 10%), and the partial pressure of the singlet molecular oxygen is rather low (being less than 175 mtorr).

The chemical generation of $O_2^*$ has been used where the $O_2^*$ is both generated and used in solutions. Such prior technique requires aqueous $H_2O_2$, a base such as NaOH, and a halogen or hypohalite salt such as Ca(OCl)$_2$. Such method is not suitable for the gas phase generation of $O_2^*$ for two principal reasons. First, the yields are low and are in the range realized by the microwave discharge technique. The second inadequacy lies in the nature of the reagents. Because the reaction is between a solid and a liquid, efficient mixing, feed control, and reaction control are difficult to obtain. Until the present invention, no method for chemically generating $O_2^*$ was known which yields an acceptably high amount of $O_2^*$ or which can be scaled up to provide practical quantities of $O_2^*$.

SUMMARY OF THE INVENTION

It is an object of the invention to provide an improved method and generator for producing singlet molecular oxygen ($O_2^*$).

It is an object of the invention to provide a method of generating $O_2^*$ which method produces a higher yield of $O_2^*$ than prior methods.

It is an object of the invention to provide a method of chemically generating $O_2^*$ with higher yields and in larger quantities than previously obtainable.

It is an object of the invention to provide a method and generator which can continuously generate $O_2^*$ by chemical means.

According to the invention, a hypohalite selected from the group consisting of $BrSO_3F$, $BrNO_3$, $BrOCF_3$, $ClSO_3F$, $ClNO_3$, $ClOCF_3$, $FSO_3F$, $FOCF_3$, and $ISO_3F$, is reacted with hydrogen peroxide to produce singlet molecular oxygen. A preferred embodiment of the reaction is illustrated by the following example:

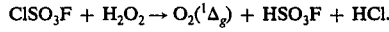

The generator for producing the singlet molecular oxygen is a reactor vessel having nozzles for introducing the chlorine fluorosulfate and hydrogen peroxide into the vessel. An outlet is provided for withdrawing the products, and the singlet molecular oxygen is separated by condensing out the other products in a condensor.

DESCRIPTION OF THE PREFERRED EMBODIMENT

Figure 1:
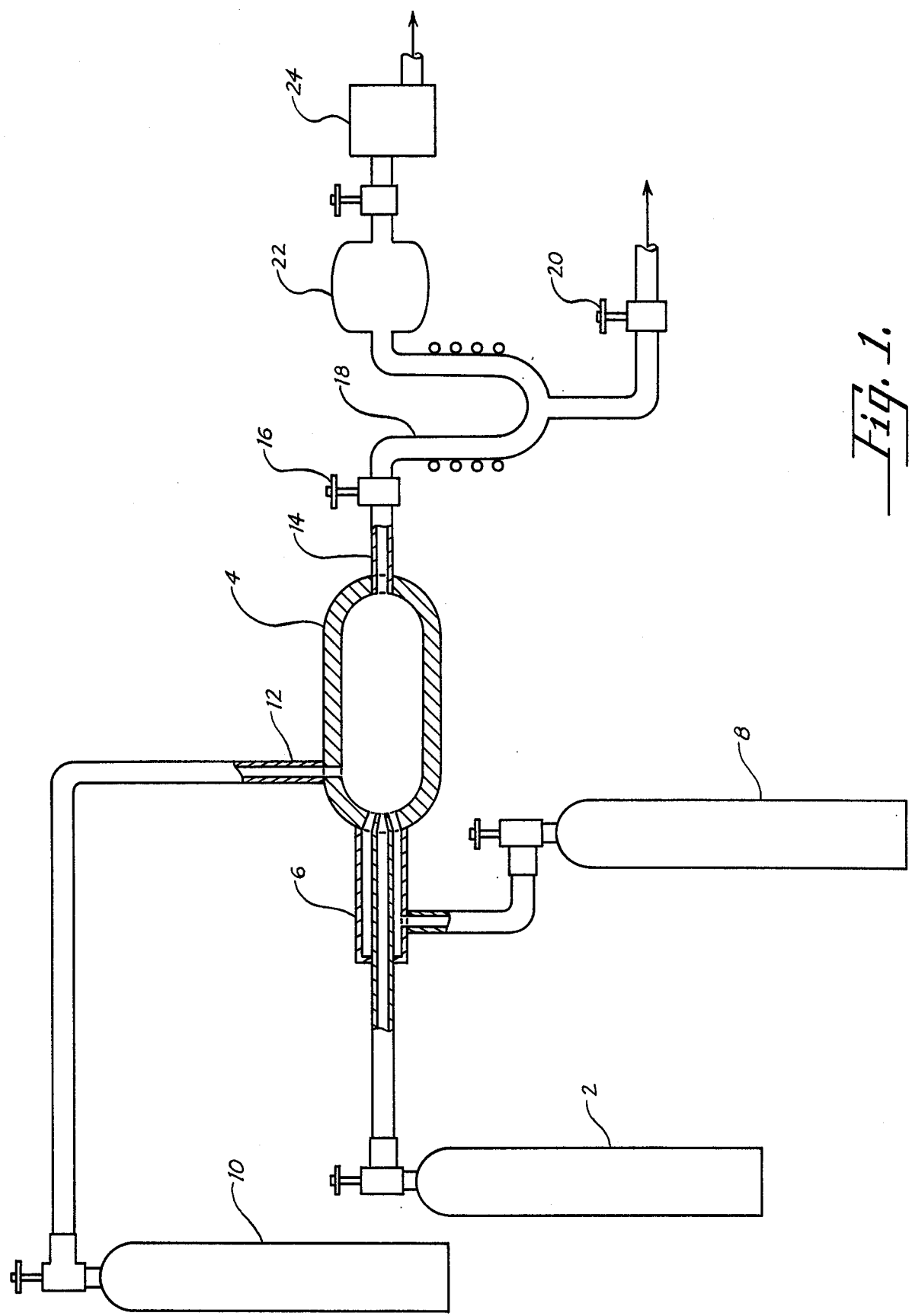
FIG. 1 is a schematic diagram of a generator for producing $O_2^*$ according to the method of the invention.

It has been discovered that hypohalites can be reacted with hydrogen peroxide to produce a high yield of singlet molecular oxygen, $O_2(^1\Delta_g)$. These reactions can be represented as follows:

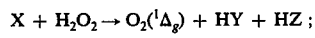

wherein
X is a hypohalite selected from the group consisting of $BrSO_3F$, $BrNO_3$, $BrOCF_3$, $ClSO_3F$, $ClNO_3$, $ClOCF_3$, $FSO_3F$, $FOCF_3$, and $ISO_3F$;
Y is F, Cl, Br, or I; and
Z is $SO_3F$, $NO_3$, or $OCF_3$.

The reactions represented by the above equation are improvements over prior methods of generating $O_2^*$ in that yields of over 40% $O_2^*$ can be readily obtained. Further, the reactants can be maintained as liquids at room temperature, and they can be fed and mixed readily under controlled conditions to produce a continuous yield of $O_2^*$. Additionally, water, which is undesirable for some applications of $O_2^*$ is not necessarily produced by these reactions.

In a preferred embodiment of the invention, a base is added to the $H_2O_2$. The base increases the rate of the reaction and results in the addition of water to the products. The amount of base added can be varied over a wide range, e.g. less than 1% to up to the solubility limit of the base in the solution. Suitable bases are the alkali hydroxides Li, Na, K, Rb, and Cs hydroxides.

The selection of a particular hypohalite as a reactant depends upon many factors within the skill of the artisan. Some of the hypohalites in the group such as $ClOCF_3$ and $ISO_3F$ present stability problems which make their use more difficult. Others are stable and easy to handle, for example $ClSO_3F$, which is a pale yellow liquid which can be synthesized according to methods described in U.S. Pat. No. 3,780,165. Hydrogen peroxide, required in all the reactions, is readily available up to about 90% $H_2O_2$ with the balance water.

The following non-limiting examples illustrate the invention:

EXAMPLE 1

Gaseous $ClSO_3F$ was bubbled through a solution of $H_2O_2$ containing approximately 20% $H_2O$ and 1% NaOH at a rate of about 0.2 cm$^3$/sec. The pressure over the peroxide mixture was approximately 12 torr. The electron spin resonance (esr) spectrum of the effluent gases showed about 20% $O_2(^1\Delta_g)$.

EXAMPLE 2

Hydrogen peroxide containing about 20% $H_2O$ and 1% NaOH were mixed with ClOSO$_2$F in helium. The flow rate of ClOSO$_2$F was about 0.5 cm$^3$/sec and that of $H_2O_2$ was about 0.5 ml/sec. A Spraying Systems Co. (Wheaton, Ill.), stainless steel liquid-gas sprayer was attached to a stainless steel mount with an O-ring groove. This assembly was connected to a pyrex cylinder with an O-ring seal. The reagents were mixed in the chamber and sprayed onto the floor of the vessel which was cooled to minus 78° C.

The reaction began slowly. After a short time, a large pressure increase was observed. The pressure in the reaction vessel increased to over 20 torr. At this pressure the esr absorption lines were too broad to obtain a quantitative measure of $O_2^*$. However, the esr spectrum did show at least 40% $O_2^*$ in the gas stream.

EXAMPLE 3

$ClNO_3$ is mixed with hydrogen peroxide containing about 20% $H_2O$ and 1% NaOH in a liquid-gas spray chamber using helium in a manner similar to example 2. At pressures of about 20 torr, a yield of over 30% $O_2^*$ should be obtained in the gas stream.

EXAMPLE 4

$ClOCF_3$ is mixed with hydrogen peroxide containing about 20% $H_2O$ and 1% NaOH in a liquid-gas spray chamber using helium in a manner similar to example 2. At pressures of about 20 torr, a yield of over 30% $O_2^*$ should be obtained in the gas stream.

Features of a generator for practicing the method of the present invention are described in the following detailed description, taken with reference to the accompanying drawing.

FIG. 1 is a schematic of a generator for producing $O_2^*$ according to the method of the invention. The selected hypohalite is sprayed into a reaction vessel 4 through nozzle 6 utilizing helium 8. A basic hydrogen peroxide solution is introduced into vessel 4 through opening 12. The reaction products are removed from vessel 4 through outlet 14 which is controlled by valve 16. The products are run through a cold trap 18 where the condensables are removed through valve outlet 20. The $O_2^*$ continues to a utilization chamber 22, for example a laser reaction chamber. Vacuum pump 24 is provided to evacuate the system prior to starting the reaction.

The $O_2^*$ is useful in the development of a chemical type laser. A continuous iodine laser has been conceived which requires a stream of singlet molecular oxygen ($O_2^*$) for its operation. The $O_2^*$ is needed in high concentration to pump ground state iodine atoms to the excited $I(5^2P_{1/2})$ state via a resonant energy transfer process.

The $O_2^*$ will be useful for synthesizing organic compounds because of its high energy state (1.0 ev above ground state).

Numerous variations and modifications may be made without departing from the present invention. Accordingly, it should be clearly understood that the form of the present invention described above and shown in the accompanying drawing is illustrative only and is not intended to limit the scope of the present invention.

What is claimed is:

1. A method of producing a mixture of gases containing singlet molecular oxygen comprising the steps of:
providing chlorine fluorosulfate;
providing a solution of hydrogen peroxide and a base;
mixing said chlorine fluorosulfate and said hydrogen peroxide whereby singlet molecular oxygen is formed by a reaction between said chlorine fluorosulfate and said hydrogen peroxide;
running products of said reaction through a cold trap to remove condensables from said products; and
withdrawing said singlet molecular oxygen and non-condensed gases.

2. A method of generating a mixture of gases containing singlet molecular oxygen, comprising the steps of:
providing a reaction vessel;
introducing $H_2O_2$ into said vessel;
introducing $ClSO_3F$ into said vessel so that $O_2(^1\Delta_g)$ is formed by the reaction: $ClSO_3F + H_2O_2 \rightarrow O_2(^1\Delta_g) + HSO_3F + HCl$;
running products of said reaction through a cold trap to remove condensables from said products; and
removing said $O_2(^1\Delta_g)$ and noncondensed gases from said cold trap.

3. The method as claimed in claim 2, wherein said reaction vessel comprises a liquid-gas sprayer.

4. The method as claimed in claim 2, wherein said $H_2O_2$ is introduced into said vessel in the form of a basic solution of $H_2O_2$ and $H_2O$.

5. The method as claimed in claim 4, wherein said solution is made basic by the addition of an alkali metal hydroxide.

6. The method as claimed in claim 2, wherein said $ClSO_3F$ is introduced into said vessel in the form of a mixture of $ClSO_3F$ and He.

7. A method of producing an effluent containing singlet molecular oxygen comprising the steps of:
providing a basic solution of $H_2O_2$; and
bubbling $ClSO_3F$ in said solution whereby an effluent containing molecular oxygen is generated by the following reaction:

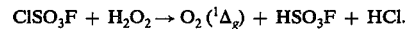

$$ClSO_3F + H_2O_2 \rightarrow O_2(^1\Delta_g) + HSO_3F + HCl.$$

8. A method of producing a mixture of singlet molecular oxygen and reactant constituents and products, comprising the steps of:
providing a halogen fluorosulfate selected from the group consisting of $ClSO_3F$, $BrSO_3F$, and $ISO_3F$;
providing hydrogen peroxide; and
mixing said selected halogen fluorosulfate and said hydrogen peroxide whereby singlet molecular oxygen is formed by a reaction between said halogen fluorosulfate and said hydrogen peroxide.

9. A method of producing a mixture of singlet molecular oxygen and reactant constituents and products, comprising the steps of:
providing a hypohalite selected from the group consisting of $BrSO_3F$, $BrNO_3$, $BrOCF_3$, $ClSO_3F$, $ClNO_3$, $ClOCF_3$, $FSO_3F$, $FOCF_3$, and $ISO_3F$;
providing hydrogen peroxide; and
mixing said selected hypohalite and said hydrogen peroxide, whereby singlet molecular oxygen is formed by a reaction between said selected hypohalite and said hydrogen peroxide.

10. The method as claimed in claim 9 including the step of providing a base, and wherein said step of mixing includes mixing said base with said selected hypohalite and said hydrogen peroxide.

11. A method of producing a mixture of singlet molecular oxygen and reactant constituents and products, comprising the steps of:
providing $ClNO_3$;
providing hydrogen peroxide; and
mixing said $ClNO_3$ and said hydrogen peroxide, whereby singlet molecular oxygen is formed by a reaction between said $ClNO_3$ and said hydrogen peroxide.

12. A method of producing a mixture of singlet molecular oxygen and reactant constituents and products, comprising the steps of:
  providing $ClOCF_3$;
  providing hydrogen peroxide; and
  mixing said $ClOCF_3$ and said hydrogen peroxide, whereby singlet molecular oxygen is formed by a reaction between said $ClOCF_3$ and said hydrogen peroxide.

13. A method of producing a mixture of singlet molecular oxygen and reactant constituents and products, comprising the steps of:
  providing $BrNO_3$;
  providing hydrogen peroxide; and
  mixing said $BrNO_3$ and said hydrogen peroxide, whereby singlet molecular oxygen is formed by a reaction between said $BrNO_3$ and said hydrogen peroxide.

14. A method of producing a mixture of singlet molecular oxygen and reactant constituents and products, comprising the steps of:
  providing $BrOCF_3$;
  providing hydrogen peroxide; and
  mixing said $BrOCF_3$ and said hydrogen peroxide, whereby singlet molecular oxygen is formed by a reaction between said $BrOCF_3$ and said hydrogen peroxide.

15. A method of producing a mixture of singlet molecular oxygen and reactant constituents and products, comprising the steps of:
  providing $FSO_3F$;
  providing hydrogen peroxide; and
  mixing said $FSO_3F$ and said hydrogen peroxide, whereby singlet molecular oxygen is formed by a reaction between said $FSO_3F$ and said hydrogen peroxide.

16. A method of producing a mixture of singlet molecular oxygen and reactant constituents and products, comprising the steps of:
  providing $FOCF_3$;
  providing hydrogen peroxide; and
  mixing said $FOCF_3$ and said hydrogen peroxide, whereby singlet molecular oxygen is formed by a reaction between said $FOCF_3$ and said hydrogen peroxide.

17. A method of producing a mixture of singlet molecular oxygen and reactant constituents and products, comprising the steps of:
  providing $ISO_3F$;
  providing hydrogen peroxide; and
  mixing said $ISO_3F$ and said hydrogen peroxide, whereby singlet molecular oxygen is formed by a reaction between said $ISO_3F$ and said hydrogen peroxide.

18. A method of producing a mixture of singlet molecular oxygen and reactant constituents and products, comprising the steps of:
  providing $BrSO_3F$;
  providing hydrogen peroxide; and
  mixing said $BrSO_3F$ and said hydrogen peroxide, whereby singlet molecular oxygen is formed by a reaction between said $BrSO_3F$ and said hydrogen peroxide.

19. A method of producing a mixture of singlet molecular oxygen and reactant constituents and products, comprising the steps of:
  providing chlorine fluorosulfate,
  providing a solution of hydrogen peroxide and a base; and
  mixing said chlorine fluorosulfate and said hydrogen peroxide whereby singlet molecular oxygen is formed by a reaction between said chlorine fluorosulfate and said hydrogen peroxide.

* * * * *